Jan. 18, 1944.     K. T. MacGILL     2,339,645

BEARING

Filed Feb. 20, 1943     2 Sheets—Sheet 1

Inventor:
Kenneth T. MacGill
by his Attorneys
Howson & Howson

Jan. 18, 1944.  K. T. MacGILL  2,339,645
BEARING
Filed Feb. 20, 1943 2 Sheets-Sheet 2

Inventor:
Kenneth T. MacGill
by his Attorneys
Howson & Howson

Patented Jan. 18, 1944

2,339,645

UNITED STATES PATENT OFFICE 2,339,645

BEARING

Kenneth T. MacGill, Berwyn, Ill., assignor to Continental-Diamond Fibre Company, Newark, Del., a corporation of Delaware Application February 20, 1943, Serial No. 476,569

6 Claims. (Cl. 308—238)

This invention relates to bearings and more particularly to that type of bearing wherein a plurality of longitudinally extending bearing strips or staves are confined within a suitable holding tube. In many such bearings, the strips consist of resinous material and more specifically of fabric impregnated with resinous materials and subsequently molded.

In such constructions, it has been the usual practice to so construct the strips that their side faces are truly radial in the diameter upon which they are to be arranged or nearly so. In actual fabricating practice it is quite common to find these strips or staves made with their sides not truly radial to the internal diameter of the tube in which they are confined, but are actually somewhat more acutely related. If the side faces are truly radial, it will follow that the edge faces of the strips will be in direct contact with one another throughout and in the second case there will, of course, be contact between the strips only at the outer margins of the side edges.

Such strips or staves are ordinarily rabbeted at the inner faces of their side edges so that pairs of adjacent strips combine to form liquid passages, a construction of this type being especially adaptable for use in the manufacture of stern tube bearings.

Composition materials of the type under discussion are subject to expansion after relatively short periods of immersion, the principally notable expansion being in a direction transverse to the strip and circumferential to the bearing. When such bearing strips expand, the circumferential pressure generated in these strips causes the bearing strips to warp away from the surface of the confining tube and bulge inwardly with the result that they will seize the supported shaft and the bearing will often become useless or the source of considerable difficulty in operation.

I have discovered that by so constructing these bearings that the effective point of contact between strips is well spaced from the outer face of the bearing, this tendency is eliminated by reason of the fact that with such a construction the chordal forces resulting from transverse expansion of the strips are exerted on a line connecting the centers of the areas of the abutting faces, such line being located radially inwardly of the center of the mass of the strip at the point of greatest bending moment with the result that the strip tends to bow outwardly and thus maintain its proper contact with the interior of the confining tube. Furthermore, since these forces tend to deform the strip outwardly toward the retaining tube, the original inside diameter is more accurately maintained, thus permitting uninterrupted satisfactory bearing operation indefinitely as compared with such bearings as ordinarily constructed.

In the drawings, wherein for the purpose of illustration, I have shown several forms of bearing strips constructed in accordance with my invention as compared with those of the prior art:

Referring now more particularly to the drawings, the numeral 10 generally designates a suitable confining tube, which tubes are, in many instances, of considerable size. Lining this tube are a plurality of strips 11, adjacent side faces of which are in contacting relation. These strips in conformity to the usual practice have their side faces at the inner edges thereof rabbeted as at 12 so that pairs of adjacent strips combine to produce longitudinally extending water grooves 13. The outer surfaces of the strips are curved to conform with the internal surface of the tube within which they are to be confined.

Figure 4:
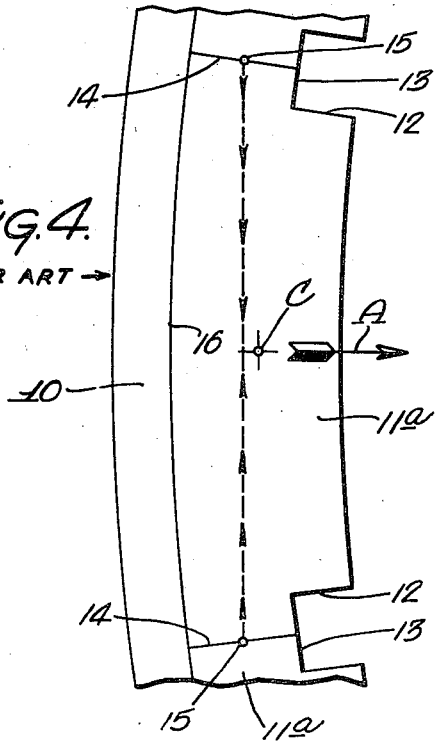
Figure 4 is a view similar to that of Figure 2, but illustrating a prior art construction embodying strips of the general type which I employ.
Figure 5:
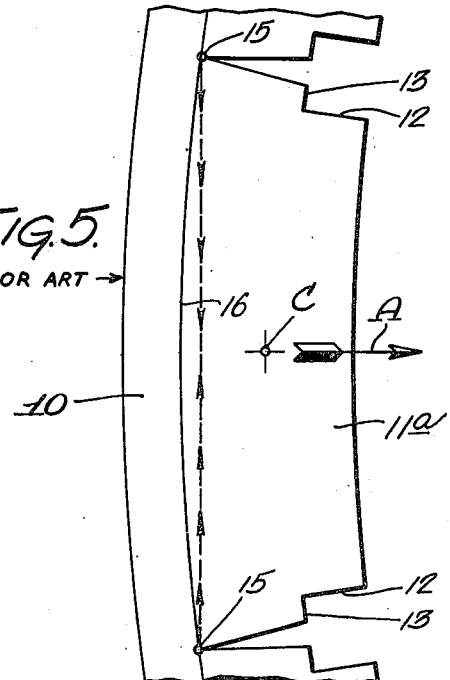
Figure 5 is a view similar to that of Figure 4, but illustrating an exaggeration of the construction which is commonly found to exist in the prior art.

Considering first the examples of the prior art given in Figures 4 and 5, it will be noted that the rabbeting employed to produce the water grooves 13 between adjacent strips 11a of Figure 4 reduces the contact between the edge faces 14 to an extent such that the center of such faces or effective point of contact, indicated at 15, is spaced well toward the outer face 16 of the bearing strip. The result is that the center of the cross-sectional area of the column of the strip material under pressure at the point of greatest bending moment (midway between the abutting faces 14) lies outwardly of the central plane of compression of the strip. Accordingly, when pressure is exerted against the ends of this column there is a tendency of the column to deflect in the direction of the arrow A and accordingly a tendency of the strip to seize a supported shaft. Obviously, this tendency will be much increased with a construction such as is illustrated in Figure 5 for, in this case, the center of pressure contact 15 between adjacent strips lies at the extreme outer face of the bearing strip and accordingly a chord subtending these points of contact will lie further outwardly of the center C.

Figure 1:
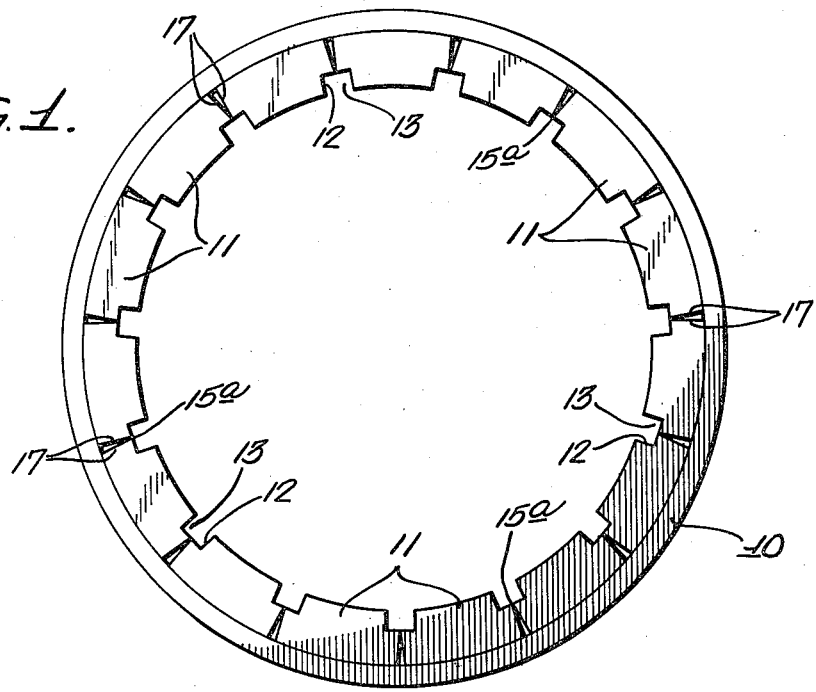
Figure 1 is an end elevation of a bearing embodying my invention.
Figure 6:
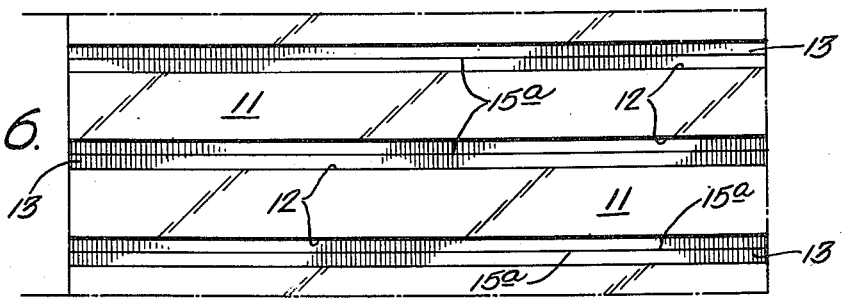
Figure 6 is a fragmentary internal elevation of the bearing.
Figure 2:
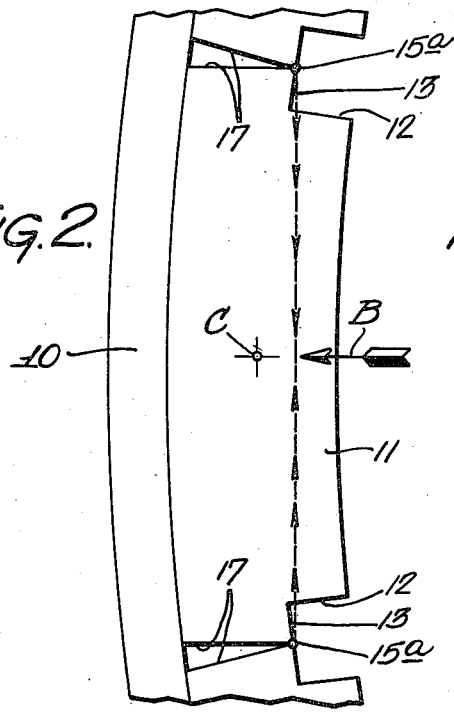
Figure 2 is an enlarged fragmentary end elevation of a bearing including strips of the type illustrated in Figure 1.
Figure 3:
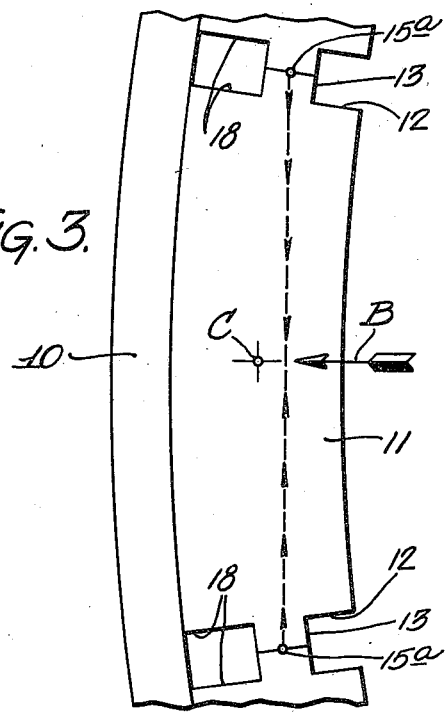
Figure 3 illustrates a slightly modified bearing construction embodying the principles of my invention.

In order to eliminate such unstable conditions, I shift the point of effective pressure contact, indicated at 15a in each of Figures 2 and 3, well inwardly upon the side surfaces of the strip. This may be accomplished by bevelling the strip as indicated at 17 in Figure 2 or by simply rabbeting the outer portion of the side face of the strip as indicated at 18 in Figure 3.

As will be noted from the construction lines indicating the direction of force at the center of the effective column which resists transverse compression of the strip, chordally directed pressure exerted on such a strip will tend to cause deflection of the strip in the direction of the arrow B of either of Figures 2 or 3 thereby maintaining proper engagement between the interior of the tube and the outer surfaces of the strips and furthermore setting up a compression in the strips themselves inhibiting inward radial expansion.

In test structures of identical size and having an identical number of bearing strips and in which the structure and material employed in the bearing strips was identical with the exception of the fact that the strips of one were constructed in accordance with my invention, as exemplified in Figure 2, and the strips of another were made in accordance with the prior art, as exemplified in Figure 5, the following results were observed during a course of ten readings extending over a period of slightly more than two and a half months.

The new structure showed an average variation of internal diameter of only 0.004″ whereas the old type structure showed a variation of 0.0237″ or roughly 600% more variation. Shim readings taken between the outer surfaces of the bearing strips and the confining tube and in the new structure showed that in no instance was there any separation of the strips from the tube in my structure, whereas in the old type structure the strips had separated to the extent of 0.003″ at the time of the fourth reading and at the last reading this spacing had extended to 0.010″. There was furthermore a considerable difference in the radial expansion of the strips. In the new form the average radial expansion was only 0.0022—″ whereas in the old type construction the average radial expansion was 0.0123—″ or roughly 550% of the expansion shown in the new form.

It will be obvious that the types of end formation, i. e., the point of contact of Figure 2 and the abbreviated flat contact of Figure 3 are merely examples of various methods of producing the desired result and that the same can be produced by many modifications of the particular constructions illustrated. I accordingly do not wish to be understood as limiting myself to the specific arrangements herein illustrated except as hereinafter claimed.

While the construction described is particularly adapted for use in bearings where the strips are composed of resin impregnated materials and more especially adapted to laminated structures of this character wherein the laminae are directed radially of the bearing, it may obviously be employed to advantage in any bearing of this type where the strips consist of material subject to expansion when exposed to liquids.

I claim:

1. A bearing of the type described comprising a confining tube and a plurality of longitudinally extending bearing strips lining the tube and having portions of the side faces thereof in contacting engagement and the radially outer portions of said side faces in spaced relation, the points of effective contact between such side faces being in such spaced relation to the outer faces thereof that in any transverse plane chordal forces in the strips resulting from transverse expansion of the strips are centered on a line radially inwardly of the respective centers of mass of the strips at the points of greatest bending movement therein.

2. A bearing according to claim 1 wherein the contact between the side faces of the strips is substantially a line contact occurring more nearly adjacent the inner than the outer faces of the strips.

3. A bearing according to claim 1 wherein the contact between adjacent strips comprises surfaces radial to the bearing axis and contact between the side faces of the strips is relieved outwardly of said contact surfaces.

4. A bearing of the type described comprising a confining tube and a plurality of longitudinally extending bearing strips lining the tube and having portions of the side faces thereof in contacting engagement and the radially outer portions of said side faces in spaced relation, the outer portions of the side faces of the strips being rabbeted whereby adjacent strips define inwardly facing water grooves, the points of effective contact between such side faces being in such spaced relation to the outer faces thereof that in any transverse plane chordal forces in the strips resulting from transverse expansion of the strips are exerted radially inwardly of the respective centers of mass of the areas of the strips which are subjected to the greatest bending moment.

5. A bearing according to claim 4 wherein the contact between the side faces of the strips is substantially a line contact occurring more nearly adjacent the inner than the outer faces of the strips.

6. A bearing according to claim 4 wherein the contact between adjacent strips comprises surfaces radial to the bearing axis and contact between the side faces of the strips is relieved outwardly of said contact surfaces.

KENNETH T. MacGILL.